US012565844B1

(12) United States Patent
Califf et al.

(10) Patent No.: US 12,565,844 B1
(45) Date of Patent: Mar. 3, 2026

(54) ICE-INTERFERENCE FEATURES FOR AIRCRAFT

(71) Applicant: General Electric Company, Evendale, OH (US)

(72) Inventors: Charles D. Califf, Greendale, IN (US); Christopher E. LaMaster, Franklin, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/822,925

(22) Filed: Sep. 3, 2024

(51) Int. Cl.
| | |
|---|---|
| *F01D 25/02* | (2006.01) |
| *B64D 15/00* | (2006.01) |
| *B64D 15/16* | (2006.01) |
| *B64D 33/02* | (2006.01) |
| *F02C 7/05* | (2006.01) |
| *F02C 7/047* | (2006.01) |

(52) U.S. Cl.
CPC ............. *F01D 25/02* (2013.01); *B64D 15/00* (2013.01); *B64D 15/16* (2013.01); *B64D 33/02* (2013.01); *F02C 7/05* (2013.01); *B64D 2033/022* (2013.01); *B64D 2033/0233* (2013.01); *F02C 7/047* (2013.01)

(58) Field of Classification Search
CPC . F01D 25/02; B64D 2033/0233; B64D 15/16; B64D 15/00; F02C 7/047
See application file for complete search history.

(56) References Cited

U.S. PATENT DOCUMENTS

| | | | | |
|---|---|---|---|---|
| 4,732,351 | A | | 3/1988 | Bird |
| 5,752,674 | A | * | 5/1998 | Mears .................... B64D 15/16 |
| | | | | 73/706 |
| 7,514,017 | B2 | | 4/2009 | Bhamidipati |
| 9,016,221 | B2 | | 4/2015 | Brennan et al. |
| 9,777,632 | B2 | | 10/2017 | Prather et al. |
| 9,982,598 | B2 | | 5/2018 | Pritchard, Jr. et al. |
| 10,501,840 | B2 | | 12/2019 | Wohl, Jr. et al. |
| 10,661,908 | B2 | | 5/2020 | Boreyko et al. |
| 10,968,771 | B2 | | 4/2021 | Crall et al. |
| 11,148,787 | B2 | | 10/2021 | Goncalves et al. |
| 11,499,079 | B2 | | 11/2022 | Ghasemi et al. |
| 2009/0272850 | A1 | * | 11/2009 | Rainous ................. B64D 15/00 |
| | | | | 60/39.093 |

(Continued)

OTHER PUBLICATIONS

Polek, "GE Installs First Additive-Made Engine Part in GE90," AINonline, Apr. 14, 2015, retrieved from <https://www.ainonline.com/aviation-news/aerospace/2015-04-14/ge-installs-first-additive-made-engine-part-ge90> on Jun. 18, 2024, 2 pages.

*Primary Examiner* — Lorne E Meade
*Assistant Examiner* — Alyson Joan Harrington
(74) *Attorney, Agent, or Firm* — Hanley, Flight & Zimmerman, LLC

(57) ABSTRACT
An example booster splitter includes an inner cylindrical structure; an outer cylindrical structure concentric with the inner cylindrical structure; an annular lip having an arc extending between the inner cylindrical structure and the outer cylindrical structure; a first protrusion at a first circumferential position on the annular lip, the first protrusion protruding axially from the annular lip and extending from the outer cylindrical structure to the inner cylindrical structure along the arc of the annular lip; and a second protrusion at a second circumferential position on the annular lip.

19 Claims, 7 Drawing Sheets

(56) References Cited

U.S. PATENT DOCUMENTS

| | | | |
|---|---|---|---|
| 2012/0181389 A1* | 7/2012 | Flemming | B64D 15/16 |
| | | | 244/53 B |
| 2019/0177857 A1 | 6/2019 | Lim et al. | |
| 2022/0001432 A1 | 1/2022 | Yao et al. | |
| 2022/0242061 A1* | 8/2022 | Howe | B29C 70/443 |
| 2022/0297819 A1 | 9/2022 | Machado et al. | |

* cited by examiner

ICE-INTERFERENCE FEATURES FOR AIRCRAFT

FIELD OF THE DISCLOSURE

This disclosure relates generally to aircraft and, more particularly, to ice accretion on aircraft surfaces.

BACKGROUND

In aircraft, a turbofan engine includes a turbomachinery core having a high-pressure compressor, a combustor, and a high-pressure turbine in serial flow relationship. The core generates a flow of propulsive gas. A low-pressure turbine is driven by exhaust gases from the core. This low-pressure turbine drives a fan through a shaft to generate a propulsive bypass flow. The low-pressure turbine also drives a low-pressure compressor or "booster," which supercharges the inlet flow to the high-pressure compressor.

Some flight conditions allow ice buildup on leading edges of engine structures, such as the fan and booster flowpath areas of the engine including the engine's booster splitter. It functions to separate the airflow for combustion (via the booster) from the bypass airflow.

Figure 1:
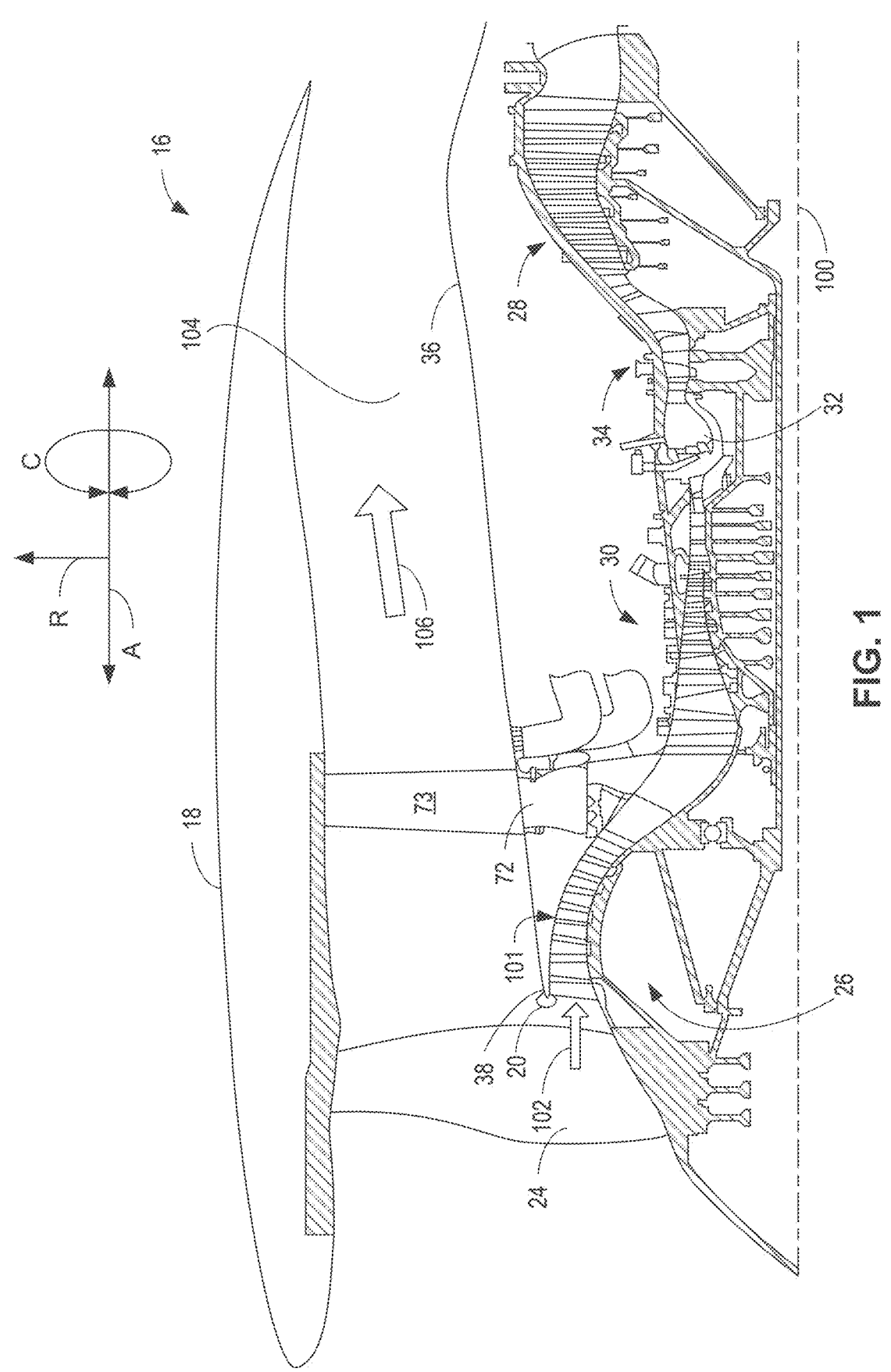
FIG. 1 is a schematic half cross-sectional side view of an example gas turbine engine incorporating a booster splitter.

In general, the same reference numbers will be used throughout the drawings and accompanying written description to refer to the same or like parts. The figures are not necessarily to scale. Instead, the thicknesses of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

During certain weather conditions, ice may accrete on booster splitters of turbine engines while an aircraft is in operation. Over time, a hoop-shaped ice formation (e.g., an ice hoop) can detach/shed from a booster splitter due to vibrations or engine heat and be ingested by a turbine engine. If the mass of the ice hoop is too high, it can cause undesirable engine responses (e.g., engine surge, engine stall, combustor flameout, mechanical damage, etc.). Prior anti-ice systems heat an entire surface of interest to prevent ice accretion. However, such systems use excessive heat which leads to weight, cost, and fuel burn penalties. Examples disclosed herein may be used to reduce ice shed volume from a booster splitter during icing conditions without needing to generate large amount of heat across an entire surface of interest. This substantially reduces the risk of undesirable engine responses (e.g., engine surge, engine stall, combustor flameout, mechanical damage, etc.) due to the ingested ice that sheds from the booster splitter.

Examples disclosed herein may be used to reduce volumes of ice shed from booster splitters by adding ice-interference features (e.g., ice-interference protrusion structures or anti-ice heat elements) at different circumferential positions of the booster splitter. For example, ice-interference features disclosed herein can be arranged along the circumference of the booster splitter to segment off a hoop-shaped ice formation into two halves or more sections. The smaller ice sections individually have lower volumes relative to the full ice-hoop. As such, the hoop strength of an entire hoop-shaped ice formation is reduced by segmenting the hoop-shaped ice formation into the smaller ice sections. As such, ice-interference features disclosed herein substantially reduce or eliminate the risk of undesirable engine responses (e.g., engine surge, engine stall, combustor flameout, mechanical damage, etc.) when the smaller ice sections detach from the booster splitter and are ingested by the turbine engine. Although example ice-interference features disclosed herein are described in connection with booster splitters, ice-interference features disclosed herein may be applied to other aircraft surfaces and/or aircraft engine surfaces in addition to or instead of booster splitters.

Various terms are used herein to describe the orientation of features. As used herein, the orientation of features, forces, and moments are described with reference to the axial direction, radial direction, and circumferential direction of the engine associated with the features, forces, and moments. In general, the attached figures are annotated with a set of axes including the axial axis A, the radial axis R, and the circumferential axis C.

FIG. 1 is a schematic half cross-sectional side view of an example engine 16 (e.g., a gas turbine engine, an aircraft engine) including an example booster splitter 38. The booster splitter 38 includes an ice-interference feature shown as an example ice-interference protrusion structure 20 (e.g., an ice-interference structure or ice-interference protrusion). The engine 16 has a longitudinal axis 100 and includes an example fan 24, an example low-pressure compressor or booster 26, and an example low-pressure turbine (LPT) 28, collectively referred to as a low-pressure system. The engine 16 also includes an example high-pressure compressor (HPC) 30, an example combustor 32, and an example high-pressure turbine (HPT) 34, collectively referred to as a gas generator or core. Various components of an example nacelle 18 and stationary structures of the engine 16, including a core nacelle 36, cooperate to define a core flowpath 101 for core airflow 102 and a bypass duct 104 for bypass airflow 106. The longitudinal axis 100 defines an axial direction along a length of the engine 16. For example, in operation, air flows through the engine 16 in the axial direction parallel to the longitudinal axis 100 of FIG. 1 such that airflow entering through the fan 24 progresses through the length of the engine 16 in a generally axial direction indicated by the core airflow 102 and the bypass airflow 106. Example struts and/or fan outlet guide vanes (OGVs) 73 extend generally radially outward from an example fan hub frame 72 to join the nacelle 18. Radial directions of the OGVs 73 are substantially perpendicular to the axial direction of the longitudinal axis 100.

The booster splitter 38 (e.g., a stationary booster splitter), which may be generally annular, may be positioned at the forward end of the core nacelle 36, between the bypass duct 104 and the core flowpath 101. The booster splitter 38 may be a single continuous ring or it may be built up from a plurality of generally arcuate segments. A variety of suitable materials such as metal alloys (e.g., titanium alloy, aluminum, nickel, steel, etc.) and/or composites (e.g., carbon fiber, epoxy, etc.) may be used to construct the booster splitter 38.

Figure 2:
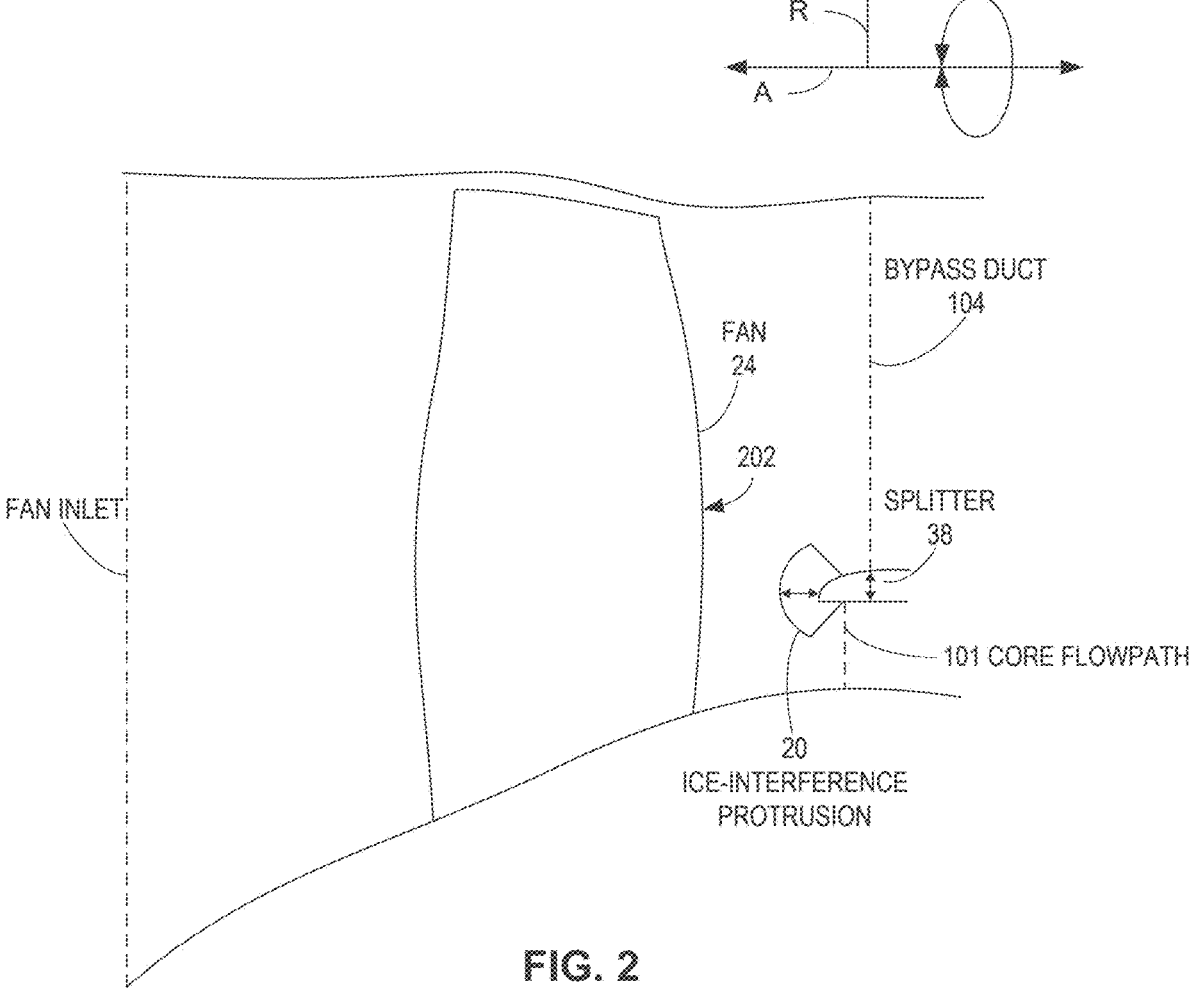
FIG. 2 is a portion of the gas turbine engine of FIG. 1 showing an enlarged view of the example ice-interference protrusion structure on the booster splitter of FIG. 1.

FIG. 2 is a portion of the engine 16 of FIG. 1 showing an enlarged view of the example ice-interference protrusion 20 on the booster splitter 38 of FIG. 1 according to an axial definition of the ice-interference protrusion 20. As shown in the example of FIG. 2, the ice-interference protrusion 20 is located aft of the fan 24 and extends from the booster splitter 38 in an axial direction (e.g., parallel to the longitudinal axis 100 of FIG. 1) towards the fan 24.

Figure 3:
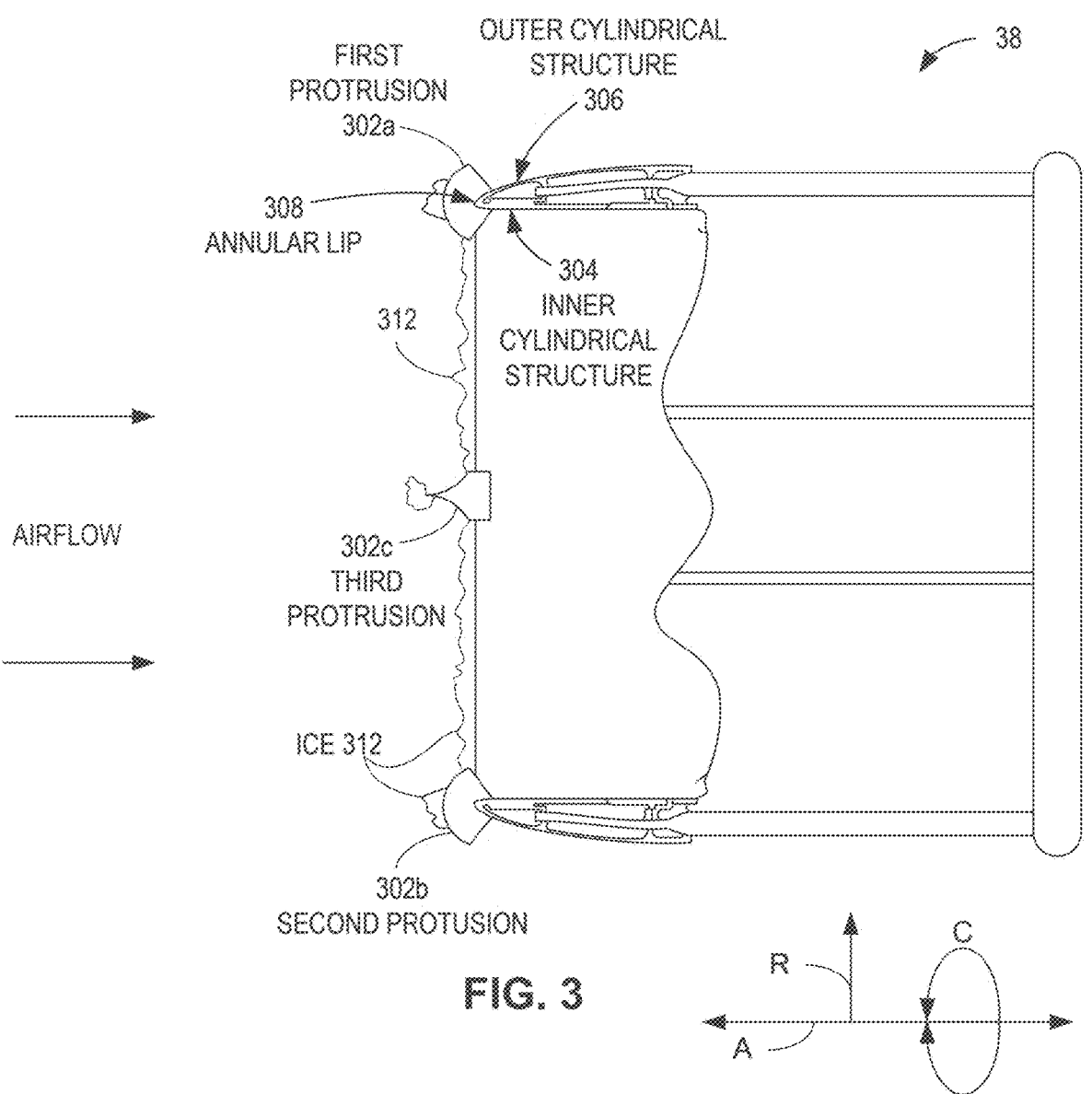
FIG. 3 is a side cross-sectional view of the booster splitter of FIGS. 1 and 2 including multiple ice-interference protrusion structures.

FIG. 3 is a side cross-sectional view of the booster splitter 38 including multiple ice-interference protrusions 302*a-c* (e.g., ice-interference features) which are substantially similar or identical to the ice-interference protrusion 20 of FIGS. 1 and 2. In example FIG. 3, the booster splitter 38 includes an inner cylindrical structure 304 and an outer cylindrical structure 306 concentric with the inner cylindrical structure 304. In addition, an example annular lip 308 connects the inner cylindrical structure 304 and the outer cylindrical structure 306.

The first ice-interference protrusion 302*a* is at a first circumferential position on the booster splitter 38, the second ice-interference protrusion 302*b* is at a second circumferential position opposite the first circumferential position on the booster splitter 38. For example, the second ice-interference protrusion 302*b* is separated by 180 degrees from the first ice-interference protrusion 302*a*. The third ice-interference protrusion 302*c* is at a third circumferential position of the booster splitter 38. The first and second circumferential positions are 180 degrees apart from one another. The third circumferential position is at a 90-degree offset from the first circumferential position and a –90-degree offset from the second circumferential position. Although not shown, the cutaway portion of the booster splitter 38 can include a fourth ice protrusion at a fourth circumferential position opposite the third circumferential position of the third ice-interference protrusion 302*c*.

Use of geometric features, such as the ice-interference protrusions 302*a-c*, on aircraft engine parts, such as the booster splitter 38, promote the creation of distinct ice accretion surfaces on the booster splitter 38 to reduce the maximum ice mass, ice structure size, and/or ice strength of ice accreted thereon to be below a threshold tolerable by the engine 16 (e.g., an ice mass threshold, an ice structure size threshold, and/or an ice strength threshold). In some examples, such a threshold tolerable by the engine 16 is based on the engine size. For example, the threshold tolerable by the engine 16 can be based on a width or thickness of the booster splitter 38 (e.g., a wall thickness (Tw) between the inner cylindrical structure 304 and an adjacent location on the outer cylindrical structure 306 shown in FIGS. 4A and 4B). Accordingly, as the size of the booster splitter 38 changes commensurate with engine size, so does the threshold tolerable by the engine 16. That is, a larger engine size can tolerate a greater ice mass, ice structure size, and/or ice strength than a smaller engine size.

The ice-interference protrusions 302*a-c* protrude axially forward from the annular lip 308 of the booster splitter 38 (e.g., towards the fan 24 of FIGS. 1 and 2) so that ice formations 312 on the annular lip 308 are segmented from one another. That is, the ice-interference protrusions 302*a-c* prevent the ice formations 312 from joining to form one large continuous ice hoop. By keeping the ice formations 312 separate, the strengths of the individual ice formations 312 are less than the hoop strength of a large ice hoop. When the ice formations 312 detach or shed from the booster splitter 38, they move along an axial direction (e.g., parallel with the longitudinal axis 100 of FIG. 1) with the airflow into the engine 16. By keeping the ice formations 312 separate, instead of a large continuous ice hoop detaching from the booster splitter 38 all at once and being ingested as a whole by the engine 16, the smaller ice formations 312 resulting from the ice-interference protrusions 302*a-c* can shed from the booster splitter 38 at different times, which decreases the amount of ice ingested by the engine 16 at any point in time. As such, the smaller ice formations 312 reduce the risk of undesirable engine responses (e.g., engine surge, engine stall, combustor flameout, mechanical damage, etc.) relative to an entire ice hoop being ingested as a whole by the engine 16.

The ice-interference protrusions 302*a-c* may be implemented using any suitable metallic or non-metallic material such as metal alloys (e.g., titanium alloy, aluminum, etc.), composites (e.g., carbon fiber, epoxy, etc.), and/or injection molded plastic. Although only the single booster splitter 38 is shown, examples disclosed herein may be implemented on any number of booster splitters on an aircraft. In addition, example ice-interference protrusions disclosed herein may be applied to other aircraft surfaces and/or aircraft engine surfaces in addition to or instead of the booster splitter 38.

Figure 4A:
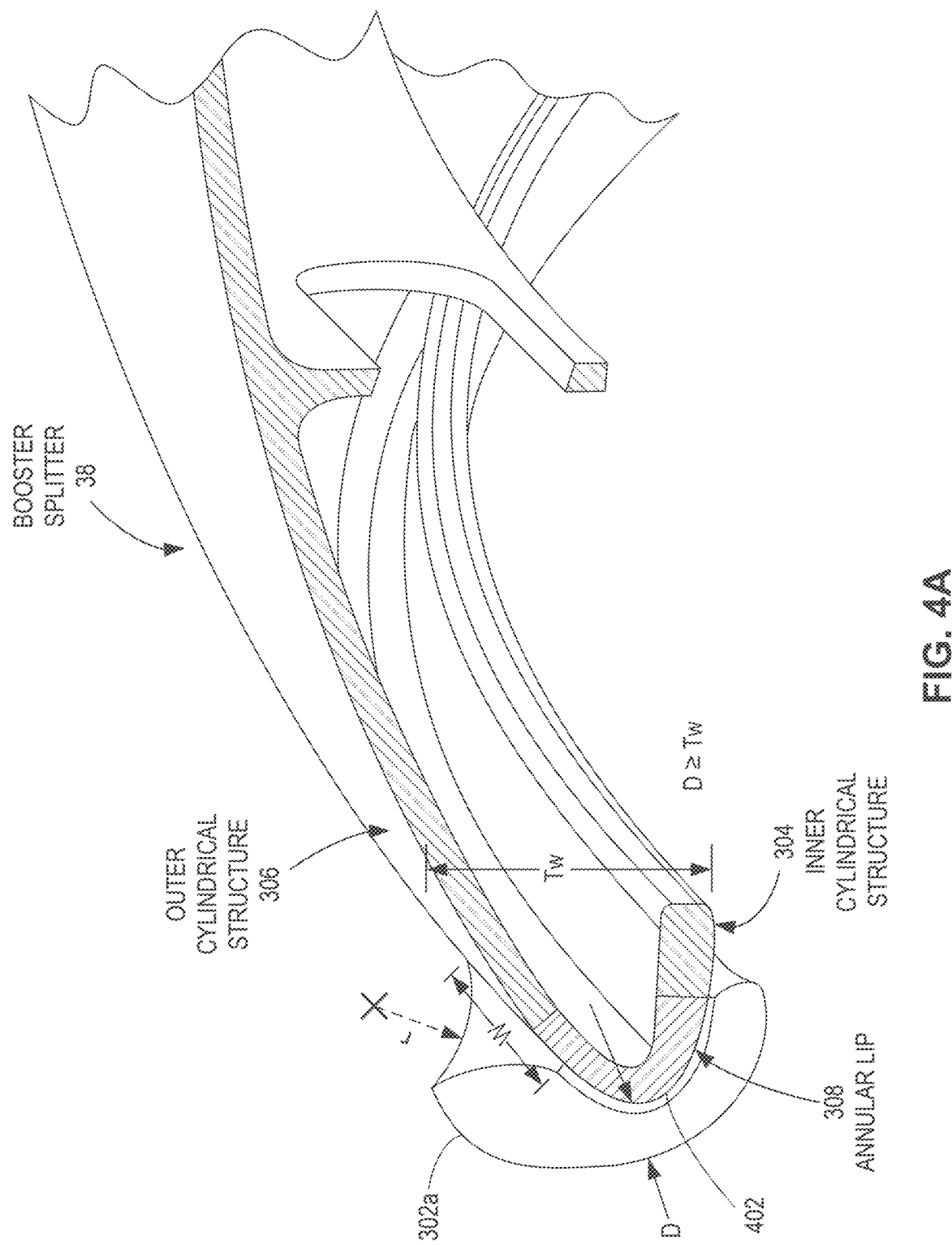
FIG. 4A is a detailed partial cutaway perspective view of an example splitter outer wall which includes the ice-interference protrusion structure of FIG. 3.
Figure 4B:
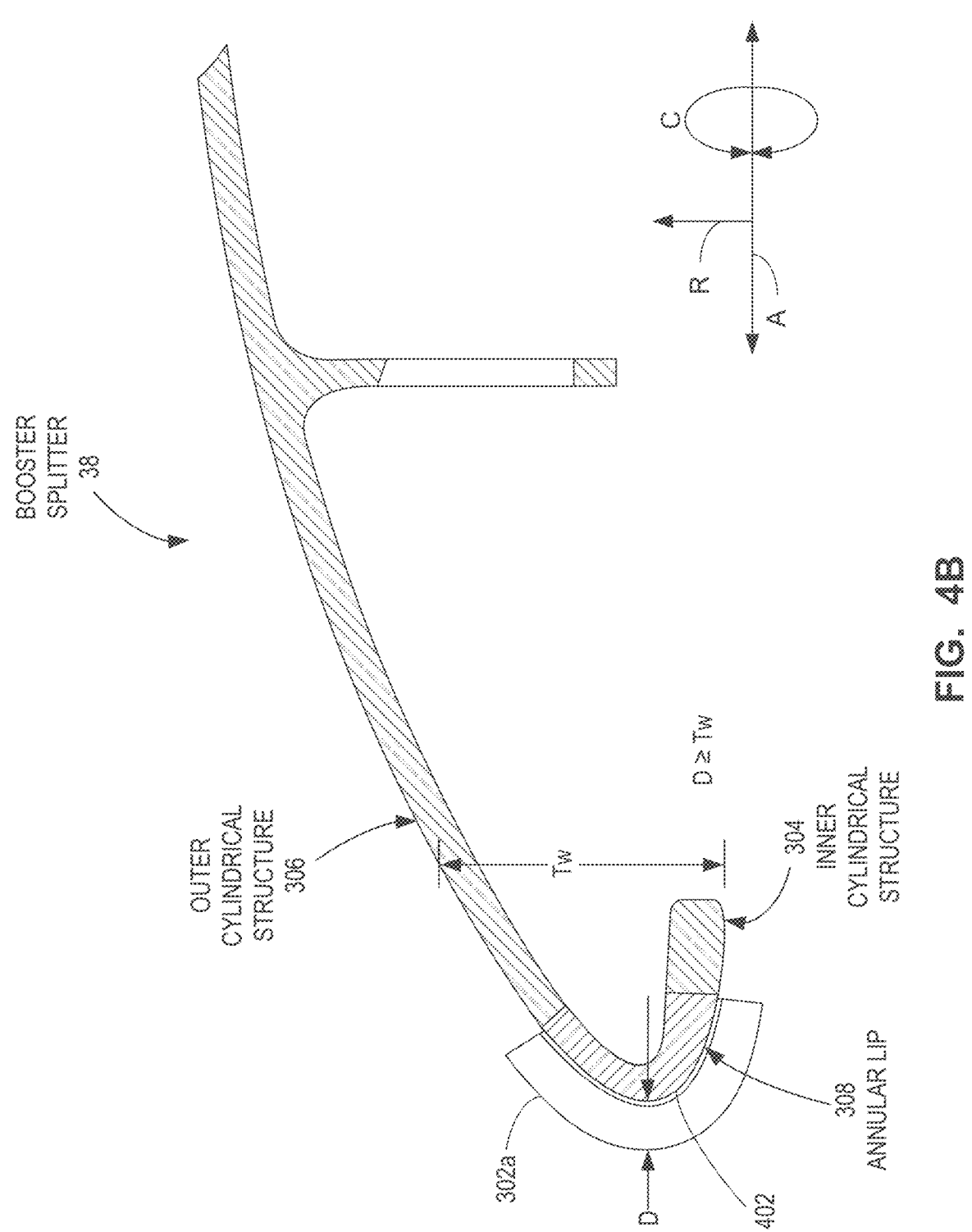
FIG. 4B is a side sectional view of the splitter outer wall of FIG. 4A.

FIG. 4A is a detailed partial cutaway perspective view of an example outer wall of the booster splitter 38 which includes the ice-interference protrusion 302*a* of FIG. 3. FIG. 4B is a side sectional view of the splitter outer wall of the booster splitter 38. In example FIG. 4A, the outer cylindrical structure 306 is shown in a concentric arrangement with the inner cylindrical structure 304. The annular lip 308 has an example arc 402 extending between the inner cylindrical structure 304 and the outer cylindrical structure 306. The ice-interference protrusion 302*a* is shown at the first circumferential position on the annular lip 308. The ice-interference protrusion 302*a* protrudes axially forward from the annular lip 308 and extends along the arc 402 of the annular lip 308 from the outer cylindrical structure 306 to the inner cylindrical structure 304. As shown in the example of FIG. 4A, the ice-interference protrusion 302*a* has a partial toroid-like shape or crescent shape that follows an arcuate path along the surface of the arc 402. Implementing the ice-interference protrusion 302*a* in an arcuate shape increases the ice-interference surface area covered by the ice-interference protrusion 302*a* to segment accreted ice along the multiple surfaces of the inner cylindrical structure 304, the arc 402, and the outer cylindrical structure 306.

In example FIG. 4A, the ice-interference protrusion 302*a* is fin-shaped having concave fillet surfaces on opposing sides of the ice-interference protrusion 302*a*. For example, the fillet surfaces at the sides of the ice-interference protrusion 302*a* are formed or fabricated to have a radius of curvature (r). That is, a first concave fillet surface and an opposing second concave fillet surface of the ice-interference protrusion 302*a* may be based on the same radius of curvature (r). Such concave fillet surfaces contribute a low impact to the aerodynamic flow-field near the ice-interference protrusion 302a to minimize the performance impact contributed by the ice-interference protrusion 302a to an aircraft or engine. In other examples, the first and second opposing concave surfaces may have corresponding radiuses of curvature (r) that differ from one another. In yet other examples, the ice-interference protrusion 302a can instead have a square or rectangular profile such that its sides are straight and parallel with one another. In yet other examples, the ice-interference protrusion 302a can be formed or fabricated to have any other profile shape (e.g., a triangle shape, a trapezoid shape, a circle shape, an oval shape, etc.). In some examples, all of the ice-interference protrusions (e.g., the ice-interference protrusions 302a-c of FIG. 3) on a splitter have substantially the same or identical profile shapes. In other examples, a splitter can be implemented with ice-interference protrusions having profile shapes that differ from one another.

In example FIGS. 4A and 4B, a protruding depth (D) (e.g., an axial length) of the ice-interference protrusion 302a can be selected based on multiple criteria. For example, the protruding depth (D) of the ice-interference protrusion 302a can be selected to be equal to or greater than a wall thickness (Tw) between the inner cylindrical structure 304 and an adjacent location on the outer cylindrical structure 306. Such dimensions are selected to prevent ice segments separated by the first ice-interference protrusion 302a from bridging over the first ice-interference protrusion 302a and connecting with one another. By making the protruding depth (D) of the ice-interference protrusion 302a equal to or greater than the wall thickness (Tw), the protruding depth (D) of the ice-interference protrusion 302a is larger than a thickness of ice that accretes on the annular lip 308 of the booster splitter 38 (e.g., regardless of engine size). Accordingly, the protruding depth (D) of the ice-interference protrusion 302a is sized sufficiently large to break the hoop strength of ice that forms on the annular lip 308. The protruding depth (D) is also selected to limit the ice-interference protrusion 302a from contacting or interfering with a trailing edge 202 of the fan 24 shown in FIG. 2. In some examples, the protruding depth (D) of the ice-interference protrusion 302a could be selected from a range of 0.5 inches to 3 inches. In addition, a width (W) of the first ice-interference protrusion 302a can be selected to maintain ice segments sufficiently separate from one another and, in turn, further prevent bridging across the ice segments over the first ice-interference protrusion 302a. In some examples, the width (W) is 0.75 inches or greater.

In some examples, the number of ice-interference protrusions (e.g., the ice-interference protrusions 302a-c) can be selected based on the engine type and/or size of the engine 16. For example, the ice mass, ice structure size, and/or ice strength that an engine can tolerate may vary by engine based on differences in engine scale, compressor capability, combustor hardware, etc. Based on such factors, a number of ice-interference protrusions can be selected so that the ice mass ingested into an engine does not produce an undesirable engine response (e.g., engine surge, engine stall, combustor flameout, mechanical damage, etc.). For larger engines or engines with more ice mass, ice structure size, and/or ice strength tolerance, two ice-interference protrusions (e.g., the ice-interference protrusions 302a,b) can be used. For smaller engines or engines with less ice mass, ice structure size, and/or ice strength tolerance, four or more ice-interference protrusions can be used.

Figure 5:
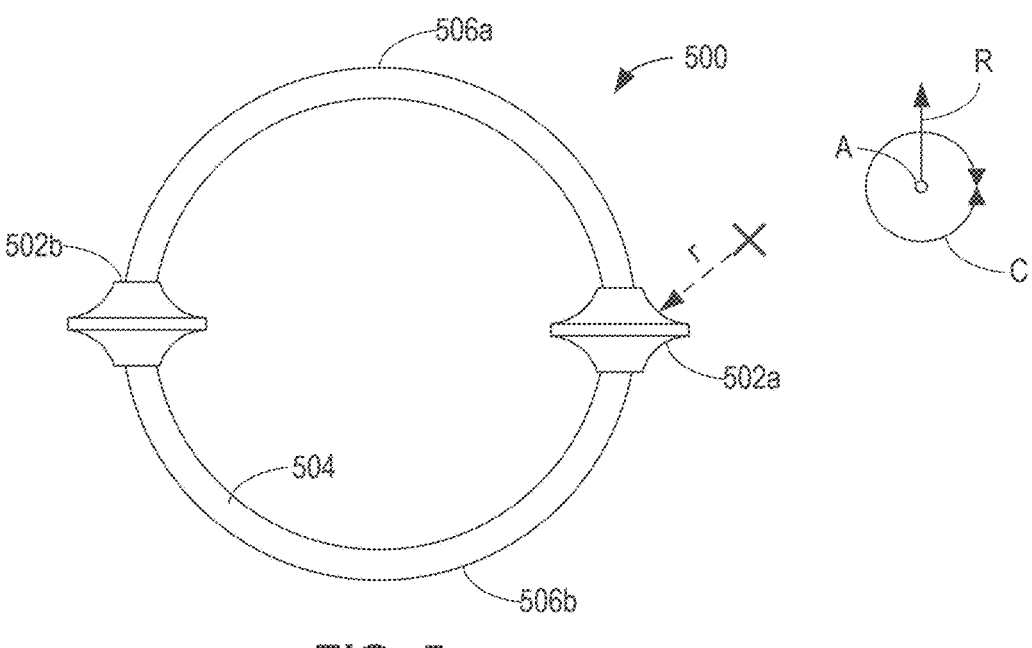
FIG. 5 is a front view of an example booster splitter implemented with two ice-interference protrusion structures.
Figure 6:
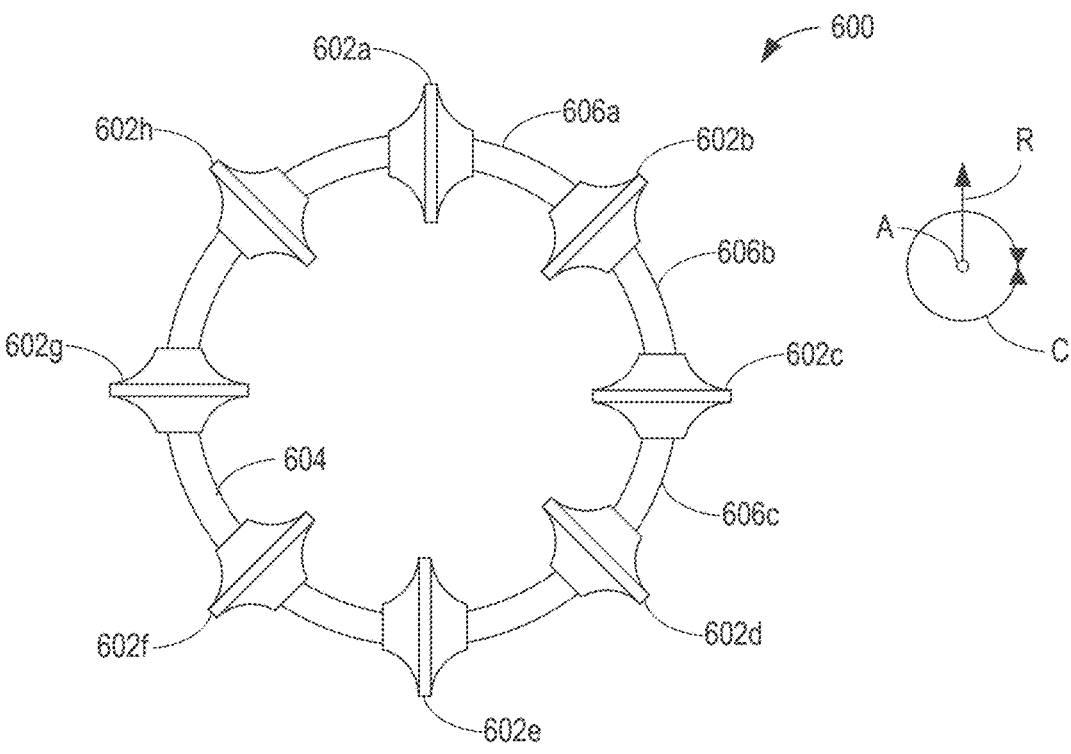
FIG. 6 is a front view of another example booster splitter implemented with eight ice-interference protrusion structures.

FIGS. 5 and 6 show circumferential definitions of ice-interference features along circumferential positions of corresponding booster splitters. For example, FIG. 5 is a front view of a booster splitter 500 implemented with two ice-interference protrusion structures 502a,b at opposing circumferential positions. In example FIG. 5, the ice-interference protrusions 502a,b divide the booster splitter 500 along an annular lip 504 into a first splitter portion 506a circumferentially spanning from the first ice-interference protrusion 502a to the second ice-interference protrusion 502b and a second splitter portion 506b circumferentially spanning from the second ice-interference protrusion 502b to the first ice-interference protrusion 502a. The first splitter portion 506a is to support accretion of a first ice structure and the second splitter portion 506b is to support accretion of a second ice structure. A protruding depth of each of the first and second ice-interference protrusions 502a,b is to be greater than the thicknesses to which the first and second ice structures accrete on the first and second splitter portions 506a,b. By implementing the ice-interference protrusions 502a,b to have such protruding depths, the first and second splitter portions 506a,b are isolated ice-accretion areas between the first and second ice-interference protrusions 502a,b so that the first and second ice-interference protrusions 502a,b maintain the first ice structure on the first splitter portion 506a separate from the second ice structure on the second splitter portion 506b.

FIG. 6 is a front view of another example booster splitter 600 implemented with eight ice-interference protrusion structures 602a-h (e.g., ice-interference structures or ice-interference protrusions) at different circumferential positions. The booster splitter 600 of FIG. 6 may correspond to an engine having less ice mass, ice structure size, and/or ice strength tolerance than an engine associated with the booster splitter 500 of FIG. 5. As such, the eight ice-interference protrusions 602a-h along an example annular lip 604 of the booster splitter 600 create smaller isolated ice-accretion areas to support accretion of smaller ice structures. The ice-interference protrusions 602a-h may be evenly spaced along the booster splitter 600 or may be spaced at different, uneven intervals.

The ice-interference protrusions 602a-h divide the booster splitter 600 along an example annular lip 604 into an example first splitter portion 606a circumferentially spanning from a first ice-interference protrusion 602a to a second ice-interference protrusion 602b, an example second splitter portion 606b circumferentially spanning from the second ice-interference protrusion 602b to a third ice-interference protrusion 602c, and an example third splitter portion 606c circumferentially spanning from the third ice-interference protrusion 602c to a fourth ice-interference protrusion 602d. The first splitter portion 606a is to support accretion of a first ice structure, the second splitter portion 606b is to support accretion of a second ice structure, and the third splitter portion 606c is to support accretion of a third ice structure. The ice structures that accrete on the first, second, and third splitter portions 606a-c are smaller than ice structures that accrete on the splitter portions 506a,b of FIG. 5. Such smaller ice structure sizes are based on the selected number of ice-interference protrusions 602a-h to substantially eliminate or reduce the likelihood of an operational hazard (e.g., engine surge, engine stall, combustor flameout, mechanical damage, etc.) of a corresponding aircraft engine that ingests the ice structures.

Figure 7:
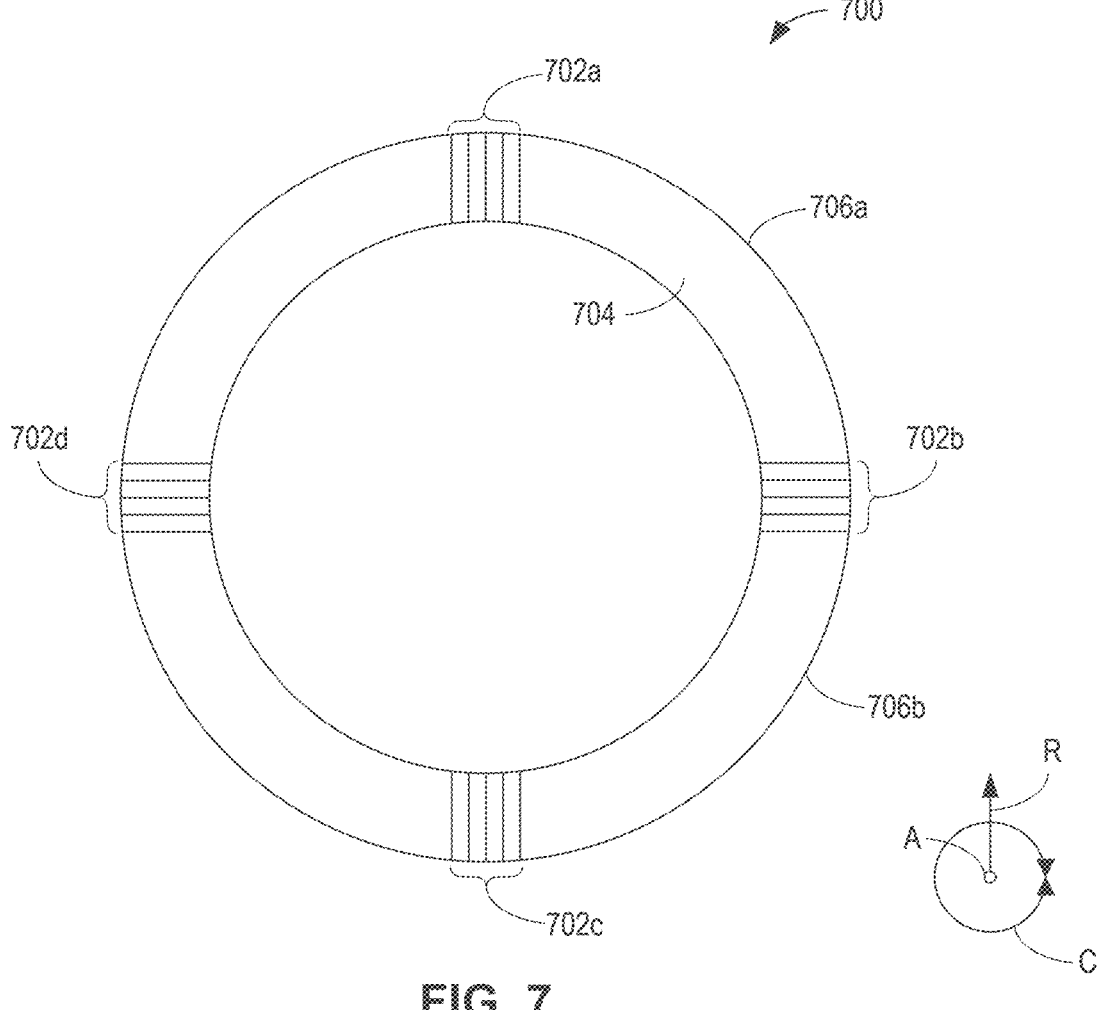
FIG. 7 is a front view of another example booster splitter including example anti-ice heat elements.

FIG. 7 is a front view of another example booster splitter 700 including four example electric-powered anti-ice heat elements 702a-d (e.g., ice-interference features) at different circumferential positions on an annular lip 704 of the booster splitter 700. When electrical power is supplied to the anti-ice heat elements 702a-d, the anti-ice heat elements 702*a-d* generate heat which prevent accretion of ice at their locations. In the example of FIG. 7, the anti-ice heat elements 702*a-d* are localized to their corresponding circumferential positions on the booster splitter 700 to create ice-interference separations between segments of ice that accrete on the booster splitter 700. For example, the anti-ice heat elements 702*a,b* divide the booster splitter 700 along the annular lip 704 into a first splitter portion 706*a* circumferentially spanning from the first anti-ice heat element 702*a* to the second anti-ice heat element 702*b* and a second splitter portion 706*b* circumferentially spanning from the second anti-ice heat element 702*b* to the third anti-ice heat element 702*c*. By localizing the anti-ice heat elements 702*a-d* to their corresponding circumferential positions on the booster splitter 700, the anti-ice heat elements 702*a-d* achieve substantially the same or similar result as the ice-interference protrusions (e.g., the ice-interference protrusion 20 of FIGS. 1 and 2, the ice-interference protrusions 302*a-c* of FIGS. 3 and 4, the ice-interference protrusions 502*a,b* of FIG. 5, and the ice-interference protrusions 602*a-h* of FIG. 6) described above. For example, as noted above, segmenting an ice hoop on the booster splitter 700 into smaller ice structure sizes (e.g., smaller-sized ice structures on the first and second splitter portions 706*a,b*) substantially eliminates or reduces the likelihood of an operational hazard (e.g., engine surge, engine stall, combustor flameout, mechanical damage, etc.) of a corresponding aircraft engine that ingests the ice structures.

The localization of the anti-ice heat elements 702*a-d* to their corresponding circumferential positions on the booster splitter 700 reduces the amount of power needed to heat the anti-ice heat elements 702*a-d* relative to power requirements for heating elements on the entire circumferential surface of the booster splitter 700. Widths of the anti-ice heat elements 702*a-d* can be selected to maintain ice segments sufficiently separate from one another and, in turn, prevent bridging across the ice segments over the anti-ice heat elements 702*a-d*. In some examples, the width of each anti-ice heat element 702*a-d* is 0.75 inches or greater.

The anti-ice heat elements 702*a-d* may be implemented using electrically resistive heating elements embedded in the material of the booster splitter 700, attached to an external surface of the booster splitter 700, or attached to an internal surface of the booster splitter 700. The anti-ice heat elements 702*a-d* are located on an annular lip (e.g., the annular lip 308 of FIGS. 3 and 4) of the booster splitter 700 and extend along an arc (e.g., the arc 402 of FIGS. 4A and 4B) of the annular lip from an outer cylindrical structure (e.g., the outer cylindrical structure 306 of FIGS. 3 and 4) to an inner cylindrical structure (e.g., the inner cylindrical structure 304 of FIGS. 3 and 4) of the booster splitter 700.

The number of anti-ice heat elements (e.g., the anti-ice heat elements 702*a-d*) to place on a booster splitter (e.g., the booster splitter 700) can be selected based on the engine type and/or size of a corresponding engine. For example, the ice mass, ice structure size, and/or ice strength that an engine can tolerate can vary by engine based on different engine characteristics such as differences in engine scale, compressor capability, combustor hardware, etc. Based on such factors, a number of anti-ice heat elements to place on the booster splitter 700 can be selected so that the ice mass, ice structure size, and/or ice strength of ice ingested into an engine does not produce an undesirable engine response (e.g., engine surge, engine stall, combustor flameout, mechanical damage, etc.). Example anti-ice heat elements, such as the anti-ice heat elements 702*a-d*, disclosed herein may be applied to other aircraft surfaces and/or aircraft engine surfaces in addition to or instead of the booster splitter 700.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

From the foregoing, it will be appreciated that example systems, apparatus, articles of manufacture, and methods have been disclosed to implement ice-interference features for aircraft. Disclosed systems, apparatus, articles of manufacture, and methods improve operation of an aircraft by decreasing ice mass, ice structure size, and/or ice strength of ice structures ingested by aircraft engines. Accordingly, examples disclosed herein substantially reduce or eliminate the risk of undesirable engine responses (e.g., engine surge, engine stall, combustor flameout, mechanical damage, etc.) when ice detaches from a booster splitter and is ingested by a turbine engine. Disclosed systems, apparatus, articles of manufacture, and methods are accordingly directed to one or more improvement(s) in the operation of a machine such as a turbine engine and/or an aircraft.

Further aspects are provided by the subject matter of the following clauses:

A booster splitter for an engine, the booster splitter comprising an inner cylindrical structure, an outer cylindrical structure concentric with the inner cylindrical structure, an annular lip having an arc extending between the inner cylindrical structure and the outer cylindrical structure, a first protrusion at a first circumferential position on the annular lip, the first protrusion protruding axially from the annular lip and extending from the outer cylindrical structure to the inner cylindrical structure along the arc of the annular lip, and a second protrusion at a second circumferential position on the annular lip.

The booster splitter of any preceding clause, wherein a protruding depth of the first protrusion is equal to or greater than a wall thickness between the inner cylindrical structure and an adjacent location on the outer cylindrical structure.

The booster splitter of any preceding clause, wherein the first protrusion is fin-shaped having concave fillet surfaces on opposing sides of the first protrusion.

The booster splitter of any preceding clause, wherein a protruding depth of the first protrusion is to be greater than a thickness of a first ice structure that accretes between the first and second protrusions, the first and second protrusions to maintain the first ice structure separate from a second ice structure.

The booster splitter of any preceding clause, wherein the second circumferential position is opposite the first circumferential position.

The booster splitter of any preceding clause, further including a third protrusion at a third circumferential position on the annular lip, the third protrusion defining an isolated ice-accretion area that circumferentially spans between the first and third protrusions and that is smaller than an ice structure size associated with an operational hazard of the engine.

A booster splitter for an engine, the booster splitter comprising an annular lip, a first protrusion at a first position on the annular lip, the first protrusion extending axially from the annular lip, the first protrusion being fin-shaped and having a first concave fillet surface and an opposing second concave fillet surface, the first and second concave fillet surfaces based on a radius of curvature, and a second protrusion at a second position on the annular lip, the second protrusion being fin-shaped and having a third concave fillet surface and an opposing fourth concave fillet surface, the third and fourth concave fillet surfaces based on the radius of curvature.

The booster splitter of any preceding clause, wherein a protruding depth of the first protrusion is greater than a thickness of an ice structure that accretes on the annular lip.

The booster splitter of any preceding clause, wherein a protruding depth of the first protrusion is to be greater than a thickness of first ice structure that accretes between the first and second protrusions, the first and second protrusions to maintain the first ice structure separate from a second ice structure.

The booster splitter of any preceding clause, wherein the first position on the annular lip is separated by 180 degrees from the second position on the annular lip.

The booster splitter of any preceding clause, further including a third protrusion at a third circumferential position on the annular lip, the third protrusion defining an isolated ice-accretion area that circumferentially spans between the first and third protrusions and that is smaller than an ice structure size associated with an operational hazard of the engine.

The booster splitter of any preceding clause, wherein the first and second protrusions extend toward a trailing edge of a fan associated with the engine.

An aircraft engine comprising a booster splitter, an annular lip on the booster splitter, a first ice-interference structure extending axially from the annular lip along an arc of the annular lip between an outer cylindrical structure and an inner cylindrical structure of the booster splitter, and a second ice-interference structure extending from the annular lip, the second ice-interference structure having a first concave fillet surface and an opposing second concave fillet surface.

The aircraft engine of any preceding clause, wherein a protruding depth of the first ice-interference structure is equal to or greater than a wall thickness between the inner cylindrical structure and an adjacent location on the outer cylindrical structure.

The aircraft engine of any preceding clause, wherein a depth of the first ice-interference structure is greater than a thickness of first ice that accretes between the first and second ice-interference structures, the first and second ice-interference structures to maintain the first ice separate from the second ice.

The aircraft engine of any preceding clause, wherein the first ice-interference structure is separated by 180 degrees from the second ice-interference structure.

The aircraft engine of any preceding clause, further including a third ice-interference structure on the annular lip, the third ice-interference structure defining an isolated ice-accretion area between the first and third ice-interference structures, the isolated ice-accretion area smaller than an ice structure size associated with an operational hazard of the aircraft engine.

The aircraft engine of any preceding clause, further including third, fourth, fifth, sixth, seventh, and eighth ice-interference structures extending axially from the annular lip along the arc of the annular lip.

The aircraft engine of any preceding clause, wherein the first and second ice-interference structures are fin-shaped.

The aircraft engine of any preceding clause, wherein the first and second ice-interference structures have at least one of a square or a rectangular profile shape.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A booster splitter for an engine, the booster splitter comprising:

an inner cylindrical structure;

an outer cylindrical structure concentric with the inner cylindrical structure;

an annular lip having an arc extending between the inner cylindrical structure and the outer cylindrical structure;

a first protrusion at a first circumferential position on the annular lip, the first protrusion protruding axially from the annular lip and extending from the outer cylindrical structure to the inner cylindrical structure along the arc of the annular lip, the first protrusion including:

a first end defining a first length coupled to the annular lip, and a second end opposite the first end defining a second length where the second length is larger than the first length, the second end protruding axially from the annular lip a protruding depth; and a first concave fillet surface and a second concave fillet surface each extending between the first end and the second end, the first concave fillet surface and the second concave fillet surface facing in opposite circumferential directions;

and a second protrusion at a second circumferential position on the annular lip.

2. The booster splitter of claim 1, wherein the protruding depth of the first protrusion is equal to or greater than a wall thickness between the inner cylindrical structure and an adjacent location on the outer cylindrical structure.

3. The booster splitter of claim 1, wherein the first protrusion is fin-shaped.

4. The booster splitter of claim 1, wherein the protruding depth of the first protrusion is to be greater than a thickness of a first ice structure that accretes between the first and second protrusions, the first and second protrusions to maintain the first ice structure separate from a second ice structure.

5. The booster splitter of claim 4, wherein the second circumferential position is opposite the first circumferential position.

6. The booster splitter of claim 1, further including a third protrusion at a third circumferential position on the annular lip, the third protrusion defining an isolated ice-accretion area that circumferentially spans between the first and third protrusions and that is smaller than an ice structure size associated with an operational hazard of the engine.

7. A booster splitter for an engine, the booster splitter comprising:

an annular lip;

a first protrusion at a first position on the annular lip, the first protrusion extending axially from the annular lip, the first protrusion including:

a first end defining a first length coupled to the annular lip, the first end defining a second length where the second length is larger than the first length, the second end protruding axially from the annular lip a protruding depth; and a first concave fillet surface and a second concave fillet surface each extending between the first end and the second end, the first concave fillet surface and the second concave fillet surface facing in opposite circumferential directions, and the first and second concave fillet surfaces based on a radius of curvature; and a second protrusion at a second position on the annular lip including a third concave fillet surface and a fourth concave fillet surface, the third and fourth concave fillet surfaces based on the radius of curvature.

8. The booster splitter of claim 7, wherein the protruding depth of the first protrusion is greater than a thickness of an ice structure that accretes on the annular lip.

9. The booster splitter of claim 7, wherein the protruding depth of the first protrusion is to be greater than a thickness of a first ice structure that accretes between the first and second protrusions, the first and second protrusions to maintain the first ice structure separate from a second ice structure.

10. The booster splitter of claim 9, wherein the first position on the annular lip is separated by 180 degrees from the second position on the annular lip.

11. The booster splitter of claim 7, further including a third protrusion at a third circumferential position on the annular lip, the third protrusion defining an isolated ice-accretion area that circumferentially spans between the first and third protrusions and that is smaller than an ice structure size associated with an operational hazard of the engine.

12. The booster splitter of claim 7, wherein the first and second protrusions extend toward a trailing edge of a fan associated with the engine.

13. An aircraft engine comprising:

a booster splitter;

an annular lip on the booster splitter;

a first ice-interference structure extending axially from the annular lip along an arc of the annular lip between an outer cylindrical structure and an inner cylindrical structure of the booster splitter, the first ice-interference structure including a first end defining a first length coupled to the annular lip, and a second end opposite the first end defining a second length where the second length is larger than the first length, the second end protruding axially from the annular lip a protruding depth; and a first concave fillet surface and a second concave fillet surface each extending between the first end and the second end, the first concave fillet surface and the second concave fillet surface facing in opposite circumferential directions; and a second ice-interference structure extending from the annular lip.

14. The aircraft engine of claim 13, wherein the protruding depth of the first ice-interference structure is equal to or greater than a wall thickness between the inner cylindrical structure and an adjacent location on the outer cylindrical structure.

15. The aircraft engine of claim 13, wherein the protruding depth of the first ice-interference structure is greater than a thickness of first ice that accretes between the first and second ice-interference structures, the first and second ice-interference structures to maintain the first ice separate from a second ice.

16. The aircraft engine of claim 15, wherein the first ice-interference structure is separated by 180 degrees from the second ice-interference structure.

17. The aircraft engine of claim 15, further including a third ice-interference structure on the annular lip, the third ice-interference structure defining an isolated ice-accretion area between the first and third ice-interference structures, the isolated ice-accretion area smaller than an ice structure size associated with an operational hazard of the aircraft engine.

18. The aircraft engine of claim 15, further including third, fourth, fifth, sixth, seventh, and eighth ice-interference structures extending axially from the annular lip along the arc of the annular lip.

19. The aircraft engine of claim 15, wherein the first and second ice-interference structures are fin-shaped.

\* \* \* \* \*